(12) United States Patent
Blanchard

(10) Patent No.: US 9,214,093 B2
(45) Date of Patent: Dec. 15, 2015

(54) AUDIO DESCRIPTION AVAILABILITY NOTIFIER

(75) Inventor: Robert Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 187 days.

(21) Appl. No.: 13/284,828

(22) Filed: Oct. 28, 2011

(65) Prior Publication Data

US 2013/0107121 A1    May 2, 2013

(51) Int. Cl.
*H04N 5/445* (2011.01)
*G09B 21/00* (2006.01)

(52) U.S. Cl.
CPC .................... *G09B 21/006* (2013.01)

(58) Field of Classification Search
CPC .............. H04N 7/173; H04N 5/445
USPC ................ 725/38, 40, 58
See application file for complete search history.

(56) References Cited

U.S. PATENT DOCUMENTS

| | | | |
|---|---|---|---|
| 8,949,902 B1 * | 2/2015 | Fabian-Isaacs et al. | 725/52 |
| 2003/0093790 A1 * | 5/2003 | Logan et al. | 725/38 |
| 2009/0259473 A1 | 10/2009 | Chang et al. | |
| 2010/0214474 A1 | 8/2010 | Matsunaga et al. | |
| 2012/0054796 A1 * | 3/2012 | Gagnon et al. | 725/40 |

FOREIGN PATENT DOCUMENTS

| | | |
|---|---|---|
| EP | 1865715 | 12/2007 |
| EP | 2209308 | 7/2010 |
| JP | 2003283937 | 10/2003 |
| JP | 2010187157 | 8/2010 |
| WO | 2010099591 | 9/2010 |

OTHER PUBLICATIONS

Partial European Search Report for EP Application No. 12187584.3 mailed from the European Patent Office on Feb. 22, 2013.
Oliveira, Rita "Audio description and automatic user identification: a promising marriage in Digital Terrestrial Television (DTT)", *University of Aveiro*, Aveiro Portugal Feb. 10, 2010.
Office Action for Taiwan Patent Application No. 101136872 mailed from the Taiwan Intellectual Property Office on Jun. 17, 2014 (with English translation).
First Office Action for Chinese Patent Application No. 201210406404.1 mailed from the Chinese Patent Office on May 6, 2015 (with English translation).

* cited by examiner

*Primary Examiner* — Kieu Oanh T Bui
(74) *Attorney, Agent, or Firm* — Fitch, Even, Tabin & Flannery LLP

(57) ABSTRACT

A method and apparatus are provided to notify a visually impaired visual media consumer of the availability of audio description for items of visual media via one or more audible indications. Further, a catalog of items of visual media can be sorted or arranged such that items of visual media having audio description may be selected or inquired about in a quicker and more convenient manner.

20 Claims, 6 Drawing Sheets

AUDIO DESCRIPTION AVAILABILITY NOTIFIER

BACKGROUND OF THE INVENTION

1. Field of the Invention

The present invention relates generally to audio description, and more specifically to indicating the availability of audio description for visually impaired individuals.

2. Discussion of the Related Art

Audio description is generally known in the art to provide visually impaired individuals with an audible description of events occurring on screen for various forms of visual media. The visually impaired, whether they be blind or impaired to a lesser degree, are consuming visual media more than ever, and with the increasing availability of audio description for visual media, especially for television programming and DVD or BluRay media, they are also able to enjoy that visual media more than ever.

Audio description, also known as video description, is an audio track that contains vocal description of the visual aspects, context, or action of a scene. Audio description is generally transmitted or stored as an alternate audio stream that can be selected played instead of, or in addition to, the main audio stream. For example, a user can generally enable audio description on modern televisions or set-top boxes through on-screen menu options to elect the alternate audio stream.

Currently, a visually impaired person is limited in their ability to find items of visual media that contain audio description. The visually impaired cannot read text descriptions of visual media nor can they see visual symbols, both of which may otherwise give an indication of the availability of the audio description for a particular item of visual media. As such, a visually impaired person can only find an item of visual media (such as a television channel or program) that does in fact contain a corresponding audio description by scrolling through every available item of visual media until he or she finds one that has audio description (i.e., by "channel surfing"). This can be time consuming for the visually impaired individual and can hinder their efficiency or enjoyment in consuming visual media. Additionally, a visually impaired individual cannot plan ahead to find visual media containing audio description they would like to watch or record in the future as they are limited simply to listening for audio description for items of visual media currently being played.

SUMMARY OF THE INVENTION

Several embodiments of the invention advantageously address the needs above as well as other needs by providing an apparatus and method for providing notice of the availability of audio description.

In accordance with one embodiment, the invention can be characterized as a method comprising the steps of determining at a processing device that audio description is available for at least one item of visual media of a catalog of items of visual media; and causing an audible indication distinct from the audio of the audio description to be emitted in response to determining at the processing device that audio description is available for the at least one item of visual media.

In accordance with another embodiment, the invention can be further characterized as providing an apparatus comprising: a processing device; a communication interface operatively connected to the processing device and configured to operatively connect to a visual media provider; and an audio device operatively connected to the processing device and configured to effectuate audible indications; wherein the processing device is configured to determine that audio description is available for at least one item of visual media from a catalog of items of visual media available from the visual media provider; and communicate to the audio device at least one instruction to effectuate an audible indication distinct from the audio of the audio description in response to determining that audio description is available for the at least one item of visual media.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
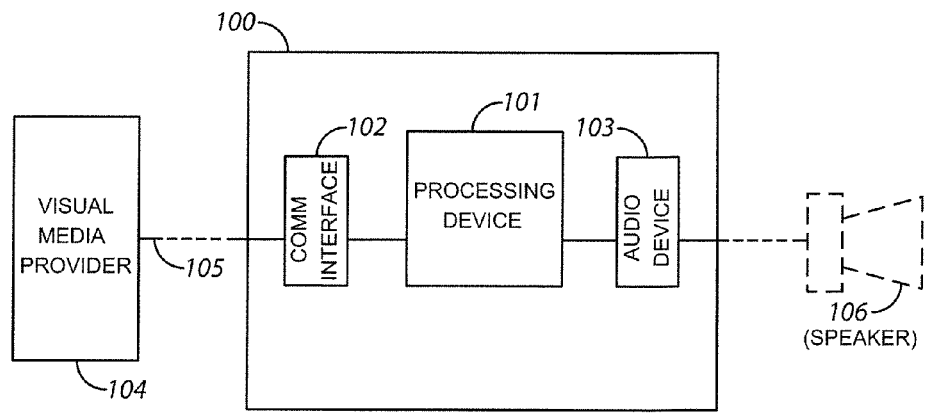
FIG. 1 illustrates an apparatus for providing notice of the availability of audio description for at least one item of visual media in accordance with various embodiments of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
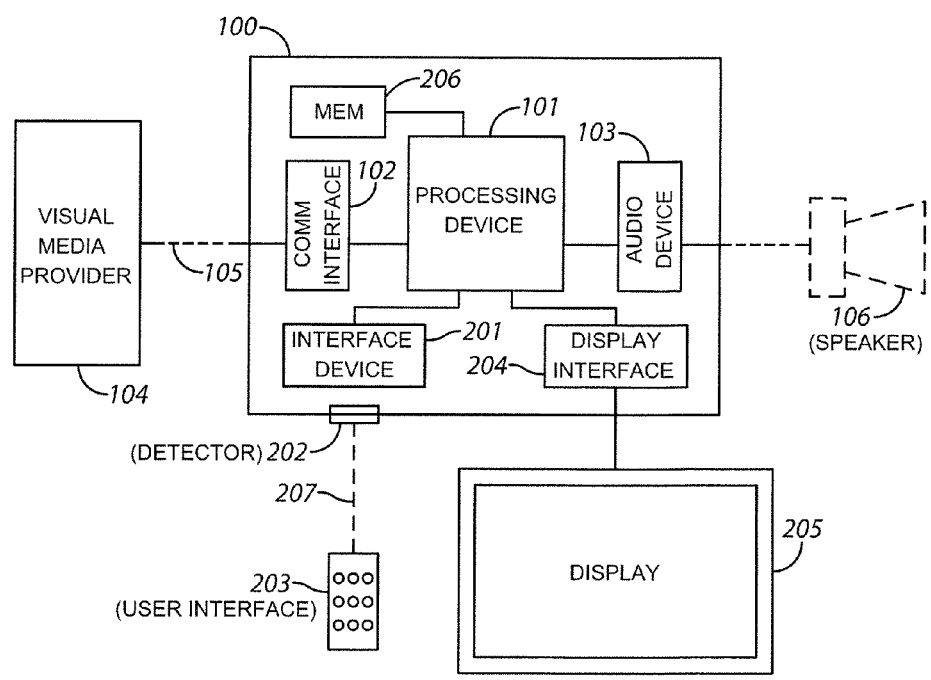
FIG. 2 shows an enhanced version of the apparatus in FIG. 1 in accordance with various embodiments of the invention.

Referring first to FIG. 1, an apparatus 100 for providing notice of the availability of audio description in accordance with various embodiments of the invention is shown. The apparatus 100 comprises at least one processing device 101, at least one communication interface 102, and at least one audio device 103. FIG. 2 shows an optionally enhanced version of the apparatus 100 in FIG. 1 in accordance with various embodiments of the invention. In a similar manner to FIG. 1, the apparatus 100 comprises at least one processing device 101, at least one communication interface 102, and at least one audio device 103. The apparatus 100 of FIG. 2 may further comprise: an interface device 201, a detector 202, a user interface 203, at least one display interface 204, at least one display 205, and at least one memory 206.

The apparatuses 100 of FIG. 1 and FIG. 2 each comprise at least one processing device 101 that is operatively connected to one or more communication interfaces 102 and at least one audio device 103. The processing device 101 may comprise one or more processors as are known in the art, including but not limited to general purpose processors, central processing units, microprocessors, microcontrollers, multi-core processors, and PIC processors. The communication interface 102 is configured to operatively connect to one or more visual media providers 104. Examples of visual media providers 104 include, but are not limited to, cable television and/or data providers, satellite television and/or data providers, terrestrial television providers, telecom providers, internet protocol television providers, internet service providers, and wireless service providers. A communication link 105 between the communication interface 102 of the apparatus 100 and the visual media provider 104 may comprise coaxial cable, optical fiber, Ethernet, TCP/IP, WiFi, WiMax, satellite or radio signals, wireless or cellular signals, or various other communication links and protocols known in the art. A sound emitting device 106, such as a speaker, buzzer, or other known sound emitting device may optionally be connected to the audio device 103 to produce audible indications.

With further reference only to FIG. 2, the processing device 101 may also be operatively connected to at least one display interface 204, which in turn may be operatively connected to at least one display 205 (such as a television, a monitor, etc). The processing device 101 is further operatively connected to at least one interface device 201 to accept inputs from or communicate with a user interface 203. The user interface 203 may comprise, but is not limited to, a television or set-top box remote control, an advanced function remote control, a smartphone, a tablet, or a general purpose computer. In accordance with one embodiment, the user interface 203 may comprise an audio device (not shown) and/or a sound emitting device (not shown) similar to the audio device 103 and sound emitting device 106 of FIG. 1. So configured, the user interface can be capable of emitting the audible indication. Optionally, the user interface 203 may also be integrated directly into the apparatus 100 as a keypad, buttons, touch screen, or other known interface types. A user interface communication link 207 is established between the user interface 203 and the interface device 201 using known methods such as, for example, infrared (IR) or other wireless or wired connectivity schemes. To effectuate this user interface communication link 207, a detector 202, such as an IR detector or other wireless detector, may be inserted between the user interface 203 and the interface device 201. Optionally, and not shown here, the user interface 203 may communicate with the interface device 201, or the processing device 101 directly, though the previously described communication interface 102, possibly though, for example, a WiFi or Ethernet network. Lastly, the processing device 101 may be operatively connected to one or more memories 206. So configured, the apparatus 100 may operate as a modified version of a set-top box (such as for cable or satellite television reception and digital video recording), digital video recorder (DVR), a television controller, a computer, a smartphone, a tablet, or other devices capable of at least one of receiving, processing, or displaying visual media. Further, the apparatus 100 can be integrated into another device such as a television, tablet, computer, etc., or exist as a separate device.

Figures 3, 4:
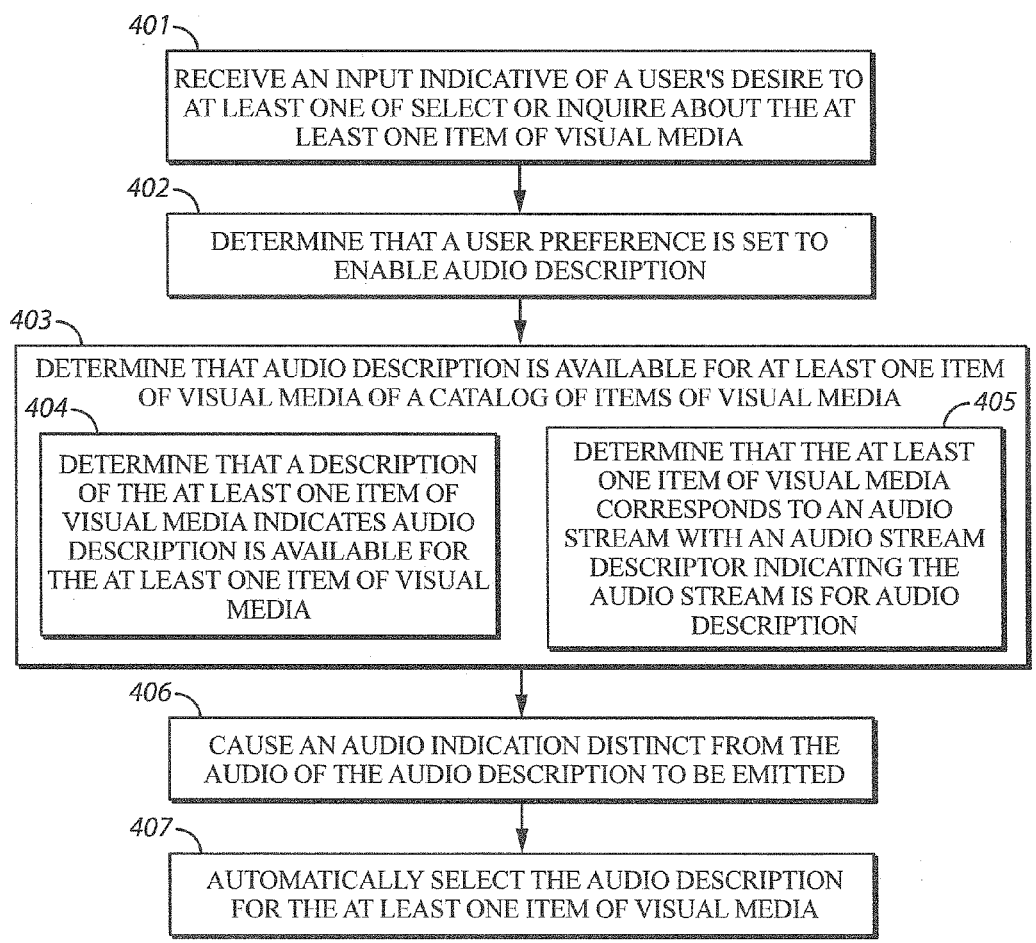
FIG. 3 is a flow diagram of a method of providing notice of the availability of audio description in accordance with various embodiments of the invention.
FIG. 4 is a flow diagram depicting steps and details beyond those of FIG. 3 in accordance with various embodiments of the invention.

In operation, and with reference now to the flow diagram depicted in FIG. 3, the apparatus 100 performs a method 300 of providing notice of the availability of audio description in accordance with various embodiments of the invention. The method 300 begins in step 301 in which a processing device 101 determines that audio description is available for at least one item of visual media of a catalog of items of visual media. An item of visual media may comprise a television or online channel or program, which may further comprise a broadcast, movie, show, series, documentary, advertisement, etc.; a video-on-demand (VOD) or pay-per-view (PPV) program (i.e., movie); or a program recorded in DVD, BluRay, or HDDVD format or existing in a non-transitory memory, such as memory 206. There are numerous other examples of items of visual media that are known in the art and to which various embodiments of the present invention may be applicable but are not listed here. The catalog of items of visual media (described in further detail in the descriptions of FIGS. 5 and 6) may be as simple as the set of current channels offered by a visual media provider 104 (such as a television service provider), a list of VOD or PPV programs offered by a visual media provider 104, a partially time-based list or matrix of programming offered by a visual media provider 104 (such as a channel guide or electronic programming guide (EPG)), or results of a query of visual media.

In step 302, based at least partially on, and in response to, the determination made in step 301, the processing device 101 will cause an audible indication that is distinct from the audio of the audio description to be emitted. Examples of an audible indication are, but are not limited to: an audible tone, a set or combination of audible tones, a chord, a short jingle or tune, a buzzer sound, a beep or series of beeping sounds, or a vocal indication (i.e., "Audio description available"). The audible indication may optionally be the same for each instance, or be altered depending on a plurality of variables. However, a single or select few audible indication is preferred to facilitate ease of recognition. In causing the audible indication to be emitted, the processing device 101 will send a signal to the audio device 103 to emit, or cause to be emitted, the audible indication. In turn, the audio device 103 emits, or causes to be emitted, the audible indication, via an internal or external sound emitting device 106, such as a speaker, buzzer, etc, or by outputting a signal to an internal or external amplifier, receiver, etc (not shown). Other devices and/or methods as are known in the art may be used to effectuate the audible indication.

By another embodiment, the processing device 101 may conversely cause an audible indication to be emitted upon determining that audio description is not available for the at least one item of visual media. By yet another embodiment, the processing device 101 may cause an audible indication to be emitted upon determining that no item of visual media of the catalog of items of visual media has audio description available. By yet another embodiment, the processing device 101 may inquiry to the user if the user desires to select the at least one item of visual media for at least one of presently viewing, presently recording, scheduling a future viewing, or scheduling a future recording of the item in response to determining that audio description is available for the at least one item of visual media of the catalog of items of visual media.

The audible indication is distinct from the audio of the audio description in that it comprises one or more recognizable sounds that the visually impaired user can associate with the availability of audio description. The audible indication is preferably emitted immediately when a user selects or inquires about an item of visual media, or shortly thereafter, with the purpose of giving the user quick notification. By this, a visually impaired user can more readily realize that the item of visual media they are playing, selecting, or inquiring about does or does not contain audio description, rather than waiting until he or she can recognize that audio description is or is not available for this particular item of visual media. Such recognition time can be relatively long due to the nature of audio description as the spoken audio description generally occupies only moments where other dialog does not exist. Additionally, audio description does not occupy every non-dialog moment in an item of visual media. Either due to lengthy dialog exchanges or due to a break in both dialog and audio description, a visually impaired user may be required to wait for an extended period of time to hear the audio description to recognize that it is available or may incorrectly decide that an item of visual media does not contain audio description and navigate away from that item. Additionally, it may be difficult for a visually impaired individual to quickly distinguish audio description from the actual dialog in an item of visual media, thus adding further to the delay of his or her recognition of audio description availability. Also, if a visually impaired user selects a channel that is at a commercial, but is otherwise featuring an item of visual media (i.e., television program) that does contain audio description, the user may not discover the availability of the audio description for that item until the commercial ends and he or she may navigate away from the channel before the commercial ends. These difficulties and delays in recognizing whether an item of visual media contains audio description can make consumption of visual media an arduous process rather than an efficient or enjoyable one for the visually impaired. By these teachings, a visually impaired user can be, in accordance with the present embodiment, nearly instantly notified of the availability of audio description by simply hearing the audible indication upon selecting or inquiring about an item of visual media.

Referring now to FIG. 4, a flow diagram 400 is depicted illustrating additional optional steps and details beyond those of FIG. 3 in accordance with various embodiments of the invention. In step 401, the processing device 101 receives an input signal indicative of a user's desire to either select or inquire about an item of visual media. Such a signal may originate at the user interface 203 (i.e., remote, etc.) by user manipulation of keys, switches, a touch screen, or any number of known command inputs. The signal may optionally be detected by the detector 202 and then processed by or passed through the interface device 201 to the processing device 101. By way of non-limiting example, the user can select an item of visual media by simply changing a channel to the selected channel or scrolling through a catalog of items of visual media (such as an EPG, channel guide, VOD list, or PPV list) and selecting it for purposes of presently viewing it, scheduling a future viewing of it, recording it for future viewing, or scheduling a future recording of it. This selection can occur with respect to items of visual media that are currently being displayed or broadcast, will be displayed or broadcast in the future, or are playable on-demand or at schedulable time.

Similarly, a user can inquire about an item of visual media by initiating a command to request information (i.e., an "info" button on a remote), or by simply scrolling though the catalog of available items of visual media by navigating to, highlighting, hovering over (such as with a mouse pointer on a computer) the item, or any other function with respect to the item of visual media. In essence, inquiring may be an active or passive activity on the part of the user. By way of another non-limiting example, and with brief reference to FIG. 9, the catalog may be visually depicted through a channel guide or electronic programming guide (EPG) 901, which a user can in turn navigate through to either select or inquire about items of visual media as described above and depicted by the highlighted item of visual media 905.

Returning to FIG. 4, in step 402 the processing device 101 determines that a user preference relating to audio description is set. More specifically, in some embodiments the preference may be with respect to enabling the feature of determining whether audio description is available, what audio stream is enabled under what circumstances (i.e., audio description when available, otherwise normal audio), or whether the audible indication is to be emitted. Setting the user preference may entail use of an on-screen menu, or other known methods to alter user preferences, generally manipulable by the user interface 203. Additionally, the status of the user preference may be stored in the memory 206 for retrieval at a later time.

It should be noted that this particular step 402 may be performed at any time and multiple times in various embodiments of this invention. For example, it may be performed as a gateway step to step 403 (as is described above) to either prevent or allow the process of determining that audio description is available for the item of visual media. Alternatively, it may be performed prior to step 406, to prevent or allow the audible indication to be emitted. Alternatively even still, it may be performed prior to step 407 (described below)

to prevent or inhibit automatic selection of audio description for the at least one item of visual media.

Figure 5:
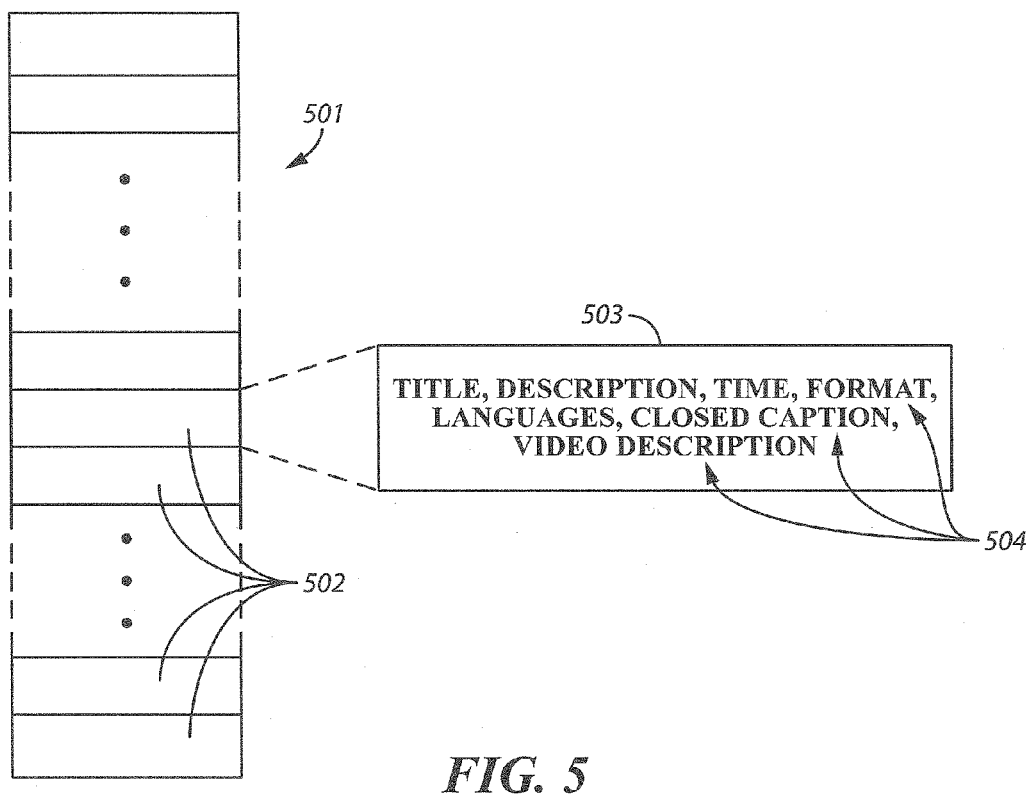
FIG. 5 is a conceptual view of a simple catalog of items of visual media in accordance with various embodiments of the invention.
Figure 6:
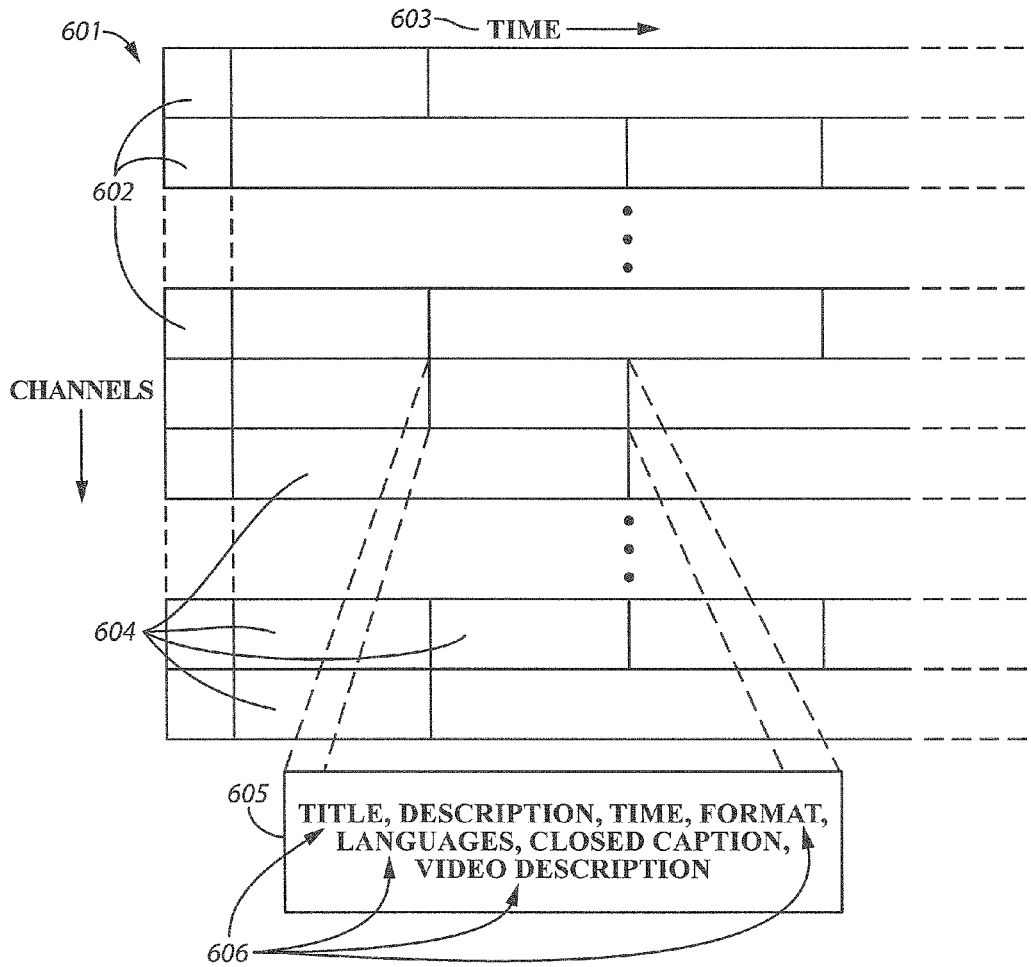
FIG. 6 is another example of a catalog of items of visual media in accordance with various embodiments of the invention.

Before continuing to the description of step 403 in FIG. 4, a brief detour to FIGS. 5 and 6 may prove helpful.

Figure 9:
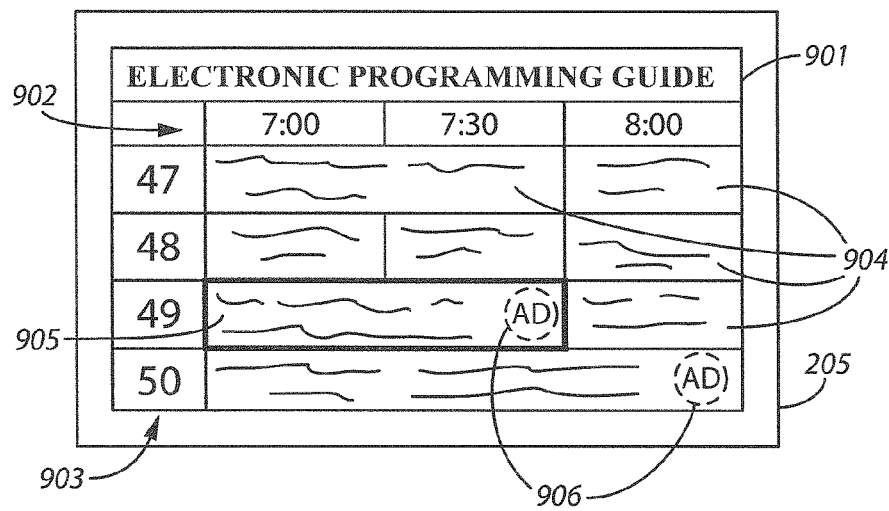
FIG. 9 is a simplified example of an electronic programming guide in accordance with the method depicted in FIG. 8 and various other embodiments of the invention.

FIG. 5 shows an abstract illustration of a hypothetical catalog of visual media 501 in list form. As previously described, this catalog 501 comprises a list of a plurality of items of visual media 502 which may correspond to the set of current channels offered by a visual media provider 104 (such as a television service provider), a list of VOD or PPV programs offered by a visual media provider 104, or results of a query of visual media. FIG. 6 shows an abstract illustration of a hypothetical catalog of visual media 601, which may comprise a partially time-based matrix of programming offered by a visual media provider 104 (and may optionally be visually displayed as a channel guide or electronic programming guide (EPG) 901 as depicted in FIG. 9, described below). This abstract illustration shows a plurality of channels 602 (be they television channels or other media channels) along the vertical axis and a timeline 603 along the horizontal axis. Various items of visual media 604 are shown assigned to at least one channel 602 and at least one time slot in the timeline 603. The catalogs 501 and 601 of FIGS. 5 and 6 may exist with the visual media provider 104 or in the memory 206 of the apparatus 100. Additionally, these catalogs 501, 601 may exist in any number of data structures or formats and are not limited by the example abstract illustrations depicted in FIGS. 5 and 6.

Both FIG. 5 and FIG. 6 also depict a selected item of visual media 503 and 605 from the respective catalogs 501 and 601 of each figure. Each selected item 503, 605 may contain one or more descriptors 504, 606, including but not limited to a title, a description, a time or duration, a format, language(s), a closed caption indicator, and an audio description indicator. These descriptors may be plain text strings, data fields, binary flags, or any other known data storage means, and may exist in any known data structure or format.

Returning to FIG. 4, step 403, which corresponds to step 301 of FIG. 3, contains further detail by describing two exemplary methods 404 and 405 of determining that audio description is available for at least one item of visual media. The first method 404 entails determining that a description of the at least one item of visual media indicates audio description is available for the at least one item of visual media. The processing device 101 can be configured to detect the availability of audio description by receiving and processing the descriptors 504, 606 for the selected items of visual media 503, 605. This may be achieved by a search for keywords in a data or text field indicating that audio description is available (such as the phrase "audio description available"), or by interrogating data fields or flags for values or other data indicating audio description is available. Alternately, the processing device 101 can be configured to perform optical character or symbol recognition for text or symbols not otherwise provided in parsable descriptors for the various items of visual media. The text or symbols may indicate the availability of audio description. One such example of a possible optical symbol is provided in FIG. 9, item 906, and is a simple "AD" in a similar manner to the familiar "CC" symbol used to indicate closed caption is available. Accordingly, the processing device 101 is able to determine the availability of audio description for at least one item of visual media through indications provided in descriptions of the item.

Figure 7:
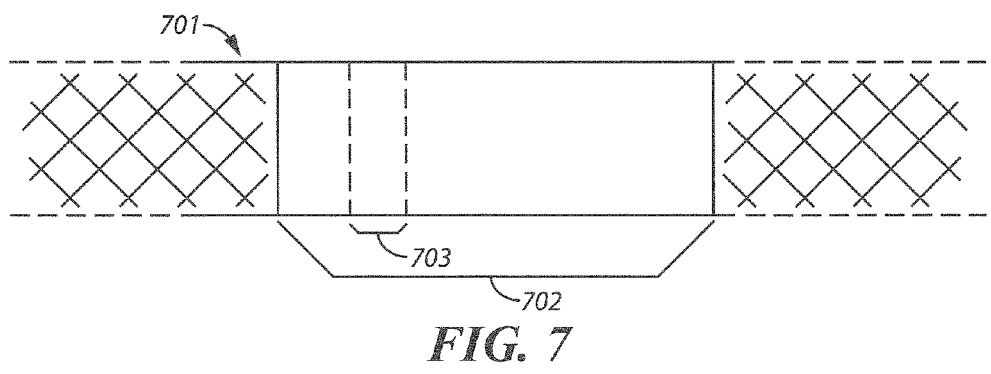
FIG. 7 depicts a simplified digital audio stream in accordance with various embodiments of the invention.

Step 405 provides an alternate method of determining that audio description exists for an item of visual media. Step 405 entails determining that the at least one item of visual media corresponds to an audio stream with an audio stream descriptor indicating the audio stream is for audio description. With reference to FIG. 7, an example audio stream 701 is depicted. This audio stream 701 may comprise an AC-3, E-AC-3, MP2, MP3, ACC, or HE-ACC audio bit stream, or any other audio stream format known in the art. The audio stream 701 may comprise a descriptor header 702 that may be intermittently transmitted or stored and further comprises various descriptive elements about the audio stream 701. One such descriptive element 703 may be the identification or mode of the audio stream 701, which may indicate that the audio stream 701 is for audio description. As a non-limiting example, the audio stream 701 may comprise an AC-3 audio bit stream, as specified by the Advanced Television Systems Committee (ATSC) for use in digital television (DTV) transmission, the descriptor header 702 comprises a 3-bit descriptive element 703 labeled bsmod (i.e., "bit stream mode"). A binary value of 2 (0b010) is specified to indicate the audio stream 701 is for "associated service: Visually Impaired (VI)". Accordingly, and returning to FIG. 4, in step 405 the processing device 101 can be configured to identify the appropriate descriptive header 702 and descriptive elements 703 that may indicate the existence of an audio description audio stream 701 for an item of visual media.

It should be noted that either of these described methods may be performed alone or in combination with each other or other methods. It should also be noted that the apparatus 100 may comprise two or more communication interfaces 102 such that two or more items of visual media may be interrogated simultaneously, or such that one or more items of visual media in addition to a currently displayed item may be interrogated without disrupting the currently displayed item of visual media. Alternatively, the communication interface 102 and/or processing unit may be configured such that two or more items of visual media may be interrogated simultaneously, or such that one or more items of visual media in addition to a currently displayed item may be interrogated without disrupting the currently displayed item of visual media.

By this, a visually impaired user is able to discover items of visual media containing audio description more rapidly. Additionally, he or she is able find items of visual media scheduled for display at a future time so that he or she may schedule viewing or recording of those items. This then allows for further consumption and enjoyment of visual media with audio description by the visually impaired user during times when no items of visual media containing audio description are currently being displayed or broadcast.

Step 406 corresponds to step 302 of FIG. 3, which is previously described.

In step 407 the processing device 101 can be configured to automatically select the audio description audio stream for the at least one item of visual media. This then allows a visually impaired user to select the item of visual media for viewing or recording without any additional steps to enable or select the audio description audio stream. This step may optionally be enabled by a determination that a user setting enabling audio description is set, such as is previously described in step 402 of FIG. 4. Additionally, this step may be implemented independent of other steps described herein.

Figure 8:
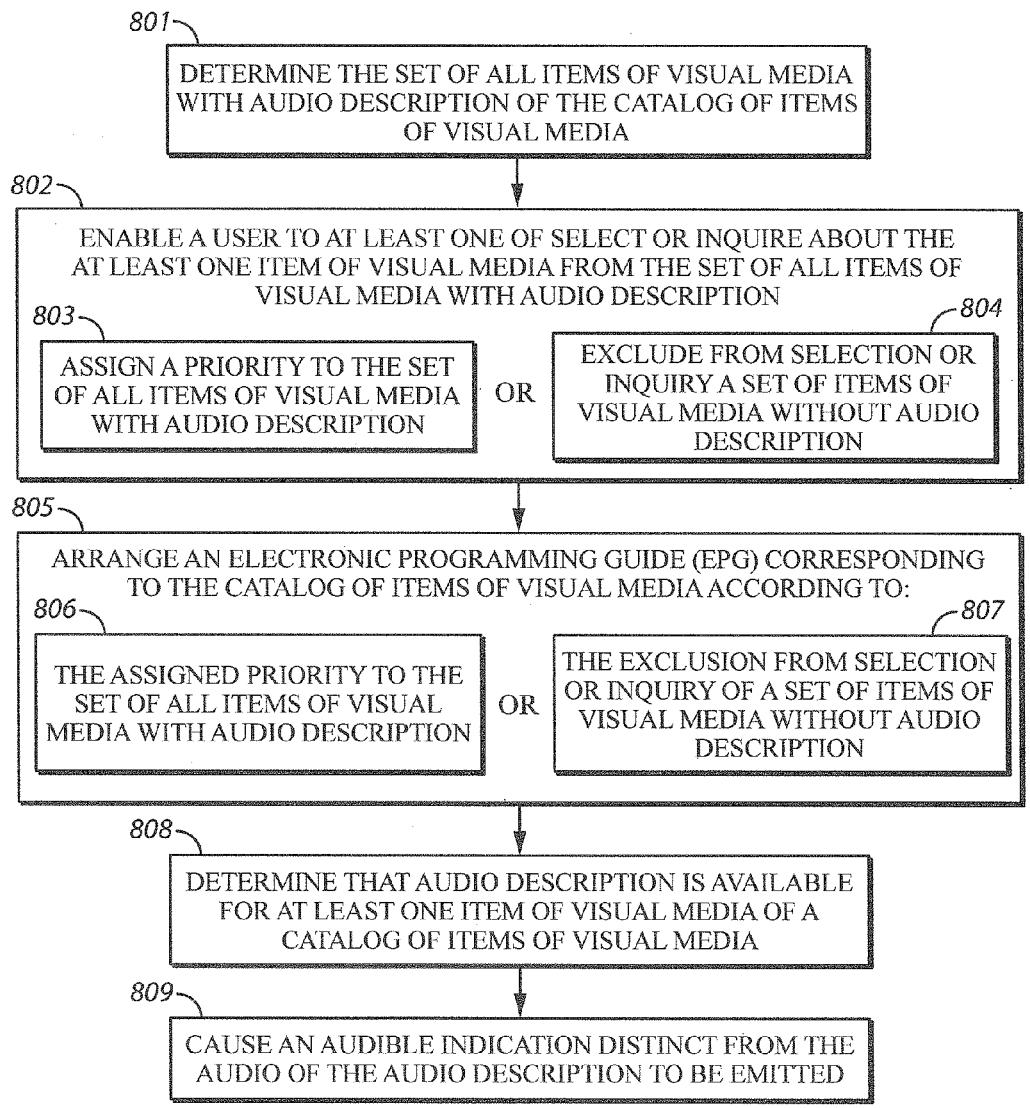
FIG. 8 is a flow diagram depicting further steps and details beyond those of FIG. 3 in accordance with various embodiments of the invention.

Referring next to FIG. 8, a flow diagram 800 is depicted illustrating additional optional steps and details beyond those of FIG. 3 in accordance with various embodiments of the invention. Step 801 describes determining the set of all items of visual media with audio description of the catalog of items of visual media. By one approach, this can be achieved by systematically interrogating each item of visual media in the catalog according to the methods depicted in either step 404 or step 405 of FIG. 4 until the set is determined. By another approach, the set may comprise a list or data structure of the items with audio description or an altered version of the catalog with additional data indicating which items have audio description. This may optionally be stored in the memory 206. This step 801 may be applied to various types of catalogs, including those depicted in FIG. 5 (list-based catalog 501) or FIG. 6 (partially time-based catalog 601). Alternatively, a list of some items of visual media with audio description (as opposed to all) may be determined.

By one approach, after the set of all items of visual media with audio description is determined, a user is then enabled to at least one of select or inquire about at least one item of visual media from the set of all items of visual media with audio description, as is illustrated by step 802. The general process of selecting or inquiring about the at least one item of visual media is previously described. In step 802, however, selection or inquiry is made from the set of all items with audio description rather than an entire catalog (unless, of course, the entire catalog is solely comprised of items of visual media with audio description). By this, a pre-sorting of the items of visual media with audio description is facilitated, thereby eliminating the need for the visually impaired user to manually search for these items, and thus adding to the user's ease of selection. Two methods (steps 803 and 804) of enabling the user to select from the set of all items of visual media with audio description are described here; however other methods of sorting and presentation may exist.

Step 803 illustrates one such method of sorting and presenting the items of visual media that do contain audio description to enable selection or inquiry therefrom. This step 803 entails assigning a priority to the set of all items of visual media with audio description. Alternatively, step 804 describes excluding from selection or inquiry a set of items of visual media without audio description. (As a point of specificity, step 804 may or may not entail presenting only the set of items with audio description for selection or inquiry to the exclusion of all items without audio description.)

By way of non-limiting example, and again with brief reference to FIGS. 5 and 6, after step 801 is performed, the processing device may arrange the catalog 501 or 601 in a manner such that the set of items of visual media with audio description is assigned a priority by being located at the top or start of the abstract catalog 501, 601 and the items of visual media without audio description located below or after the first set. Accordingly, the set of items with audio description may be presented to the visually impaired user prior to those without to expedite the user's selection. For the case of a partially time-based matrix catalog 601, this prioritized sorting may occur for each time period of the timeline 803 or for each channel 602, thereby presenting the list of all items with audio description in each time period of the timeline 603 or channel 802 to the user for selection or inquiry first. Alternatively, the catalog 501, 601 may remain in its previous form, but navigation of the catalog may be altered such that navigation to items with audio description is prioritized before navigation to items without audio description. Alternatively even still, and by step 804, the set of all items with audio description is presented to the user for selection or inquiry to the exclusion of a set of items without audio description.

Returning to FIG. 8, step 805 describes arranging an Electronic Programming Guide (EPG) corresponding to the catalog of items of visual media according to either the assigned priority to the set of all items of visual media with audio description (step 803), or the exclusion from selection or inquiry of a set of items of visual media without audio description (step 804). Step 806 refers to the assignment of priority as described in step 803, and step 807 refers to the exclusion from selection or inquiry described in step 804. In essence, step 805 and sub-steps 806 and 807 describe altering a visual presentation of the abstract catalogs 501, 601 such that navigation and use of the visual presentation is possible by a visually impaired user.

Figure 10:
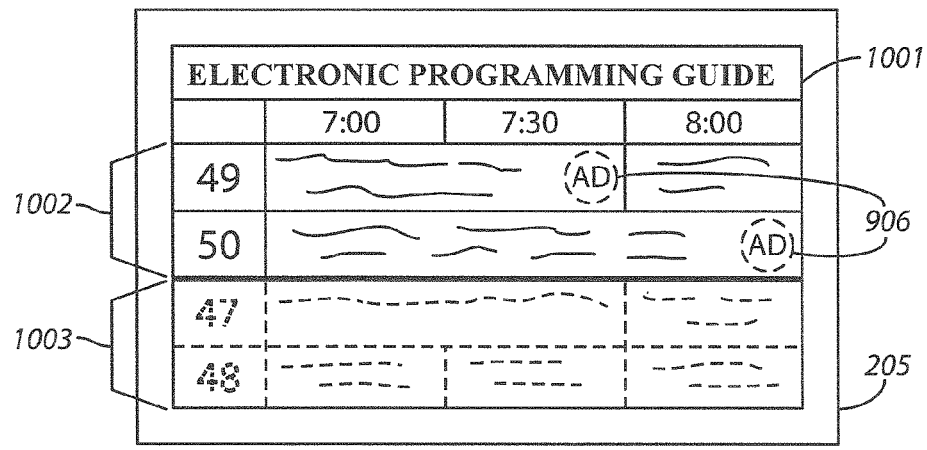
FIG. 10 is a simplified example of a modified version of the electronic programming guide shown in FIG. 9 in accordance with the method depicted in FIG. 8 and various other embodiments of the invention.

With reference now to FIGS. 9 and 10, steps 805, 806, and 807 are further described. FIG. 9 shows an EPG 901 in accordance with various embodiments of this invention. Alternatively, this could represent a channel guide or a mere list of items of visual media offered by a visual media provider 104. EPG's and channel guides are generally known in the art. The example EPG 901 is a visual representation of a partially time-based matrix catalog 601 as may be presented on a display 205. The EPG 901 contains a horizontal time line 902, a vertical channel list 903, and a plurality of items of visual media 904 with descriptions available at various times of the timeline 902 on various channels 903. This particular EPG 901 shows one highlighted item 905 which may be highlighted as the result of a user's navigation to that item using the user interface 203 and/or selection or inquiry about that item. Additionally, optional "AD" symbols 906 are shown that may indicate that audio description is available for those items of visual media 904.

FIG. 10 illustrates one example of an arranged EPG 1001 in accordance with step 805 of the present embodiment of the invention. The set of items of visual media with audio description 1002 is displayed on the EPG 1001 to the exclusion of the items without audio description 1003, in accordance with step 807 and other embodiments of this invention. Optionally, the set of items without audio description 1003 may be shown, but is subject to the assigned priority of step 806, being presented after the set of items with audio description 1002. So configured, the EPG 1001 offers an arranged presentation scheme that facilitates expedited selection of or inquiry about items of visual media with audio description.

It should be noted that steps 802-807 may optionally be performed automatically, or in response to determining that a set of user preferences indicates that any of these steps are to be performed, or upon receiving a user input to perform any one of these steps 802-807.

Step 808 corresponds to step 301 of FIG. 3 and step 403 of FIG. 4, and step 809 corresponds to step 302 of FIG. 3 and step 406 of FIG. 4, which are all previously described.

By these teachings, a visually impaired user can more readily recognize that an item of visual media he or she is playing, selecting, or inquiring about does or does not contain audio description. Additionally, various embodiments provide for expedited discovery of items of visual media that contain audio description through arrangement of catalogs of items of visual media. Additionally even still, the visually impaired user is able to find items of visual media scheduled for display in the future so that they may schedule viewing of those items or record those items (which allows for further enjoyment of visual media with audio description during times when no such items are currently being displayed or broadcast). The end result is a more efficient, and therefore, more enjoyable overall visual media consumption experience for a visually impaired user.

Many of the functional units described in this specification have been labeled as devices or interfaces, in order to more particularly emphasize their implementation independence. For example, a device or interface may be implemented as a hardware circuit comprising custom VLSI circuits or gate arrays, off-the-shelf semiconductors such as logic chips, transistors, or other discrete components. A device or interface may also be implemented in programmable hardware devices such as field programmable gate arrays, programmable array logic, programmable logic devices or the like.

Devices or interfaces may also be implemented in software for execution by various types of processors. An identified device or interface may, for instance, comprise one or more physical or logical blocks of computer instructions that may, for instance, be organized as an object, procedure, or function. Nevertheless, the executables of an identified device or interface need not be physically located together, but may comprise disparate instructions stored in different locations which, when joined logically together, comprise the device or interface and achieve the stated purpose for the device or interface.

Indeed, a device or interface composed of executable code could be a single instruction, or many instructions, and may even be distributed over several different code segments, among different programs, and across several memory devices. Similarly, operational data may be identified and illustrated herein within devices or interfaces, and may be embodied in any suitable form and organized within any suitable type of data structure. The operational data may be collected as a single data set, or may be distributed over different locations including over different storage devices (such as a memory), and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A method of providing notice of the availability of audio description, the method comprising:
    determining at a processing device that audio description is available for at least one item of visual media of a catalog of items of visual media;
    determining at the processing device the set of all items of visual media with audio description of the catalog of items of visual media;
    assigning a priority to the set of all items of visual media with audio description; and
    causing an audible indication distinct from the audio of the audio description to be emitted in response to determining at the processing device that audio description is available for the at least one item of visual media.

2. The method of claim 1 wherein the audible indication comprises at least one of an audible tone, a set of audible tones, or an audible vocal indication.

3. The method of claim 1 further comprising:
    determining at the processing device that at least one user preference relating to audio description is set; and
    automatically selecting the audio description for the at least one item of visual media upon determining by the processing device that the at least one user preference includes automatically selecting the audio description for the at least one item of visual media.

4. The method of claim 1 wherein the at least one item of visual media comprises at least one of a television program or a television channel.

5. The method of claim 1 wherein the determining at a processing device that audio description is available for the at least one item of visual media is responsive to receiving an input signal at the processing device indicative of a user's desire to at least one of select or inquire about the at least one item of visual media.

6. The method of claim 5 wherein the receiving an input signal at the processing device is in response to a user at least one of selecting the at least one item of visual media from a visually depicted catalog or inquiring about the at least one item of visual media by scrolling through and highlighting the item of visual media on a visually depicted catalog.

7. The method of claim 1 wherein the priority includes arranging the catalog such that the set of all items of visual media with audio descriptions is located at the start of the catalog and items of the catalog without audio descriptions are located after the set of all items of visual media with audio descriptions.

8. The method of claim 7 further comprising:
    arranging by the processing device an Electronic Programming Guide (EPG) corresponding to the catalog of items of visual media.

9. The method of claim 1 wherein determining at the processing device that audio description is available for the at least one item of visual media from the catalog of items of visual media further comprises determining that the at least one item of visual media corresponds to an audio stream with an audio stream descriptor indicating the audio stream is for audio description.

10. The method of claim 1 wherein determining at the processing device that audio description is available for the at least one item of visual media from the catalog of items of visual media further comprises determining that a description of the at least one item of visual media indicates audio description is available for the at least one item of visual media.

11. An apparatus for providing notice of the availability of audio description comprising:
    a processing device
    a communication interface operatively connected to the processing device and configured to operatively connect to a visual media provider; and
    an audio device operatively connected to the processing device and configured to effectuate audible indications;
    wherein the processing device is configured to:
        determine that audio description is available for at least one item of visual media of a catalog of items of visual media;
        determine at the processing device the set of all items of visual media with audio description of the catalog of items of visual media;
        assign a priority to the set of all items of visual media with audio description; and
        communicate to the audio device at least one instruction to effectuate an audible indication distinct from the audio of the audio description in response to determining that audio description is available for the at least one item of visual media.

12. The apparatus of claim 11 wherein the processing device is further configured to:
    determine that at least one user preference is set to enable audio description; and
    automatically select the audio description for the at least one item of visual media upon deteimination by the processing device that the at least one user preference includes automatically selecting the audio description for the at least one item of visual media.

13. The apparatus of claim 11 wherein the visual media provider comprises at least one of a cable provider, satellite provider, terrestrial television provider, telecom provider, internet protocol television provider, internet service provider, or wireless service provider.

14. The apparatus of claim 11 further comprising an interface device operatively connected to the processing device and configured to accept inputs from a user interface.

15. The apparatus of claim 14 wherein the processing device is configured to determine that audio description is available for at least one item of visual media of a catalog of items of visual media in response to receiving at least one signal from the interface device indicative of a user's desire to at least one of select or inquire about the at least one item of visual media.

16. The apparatus of claim 11 further comprising a display interface operatively connected to the processing device and configured to operate at least one display.

17. The apparatus of claim 11 wherein the priority includes arranging the catalog such that the set of all items of visual media with audio descriptions is located at the start of the catalog and items of the catalog without audio descriptions are located after the set of all items of visual media with audio descriptions.

18. The apparatus of claim 17 wherein the processing device is further configured to:
arrange an Electronic Programming Guide (EPG) corresponding to the catalog of items of visual media.

19. The apparatus of claim 11 wherein the processing device is further configured to determine that audio description is available for the at least one item of visual media from the catalog of items of visual media by determining that the at least one item of visual media corresponds to an audio stream with an audio stream descriptor indicating the audio stream is for audio description.

20. The apparatus of claim 11 wherein the processing device is further configured to determine that audio description is available for the at least one item of visual media from the catalog of items of visual media by determining that a description of the at least one item of visual media indicates audio description is available for the at least one item of visual media.

* * * * *

UNITED STATES PATENT AND TRADEMARK OFFICE
CERTIFICATE OF CORRECTION

PATENT NO. : 9,214,093 B2
APPLICATION NO. : 13/284828
DATED : December 15, 2015
INVENTOR(S) : Blanchard It is certified that error appears in the above-identified patent and that said Letters Patent is hereby corrected as shown below:

In the CLAIMS:
Claim 12, column 12, line 56, delete "deteimination" and insert --determination--.

Signed and Sealed this
Tenth Day of May, 2016

Michelle K. Lee
*Director of the United States Patent and Trademark Office*